(12) United States Patent
Matsui

(10) Patent No.: US 8,361,651 B2
(45) Date of Patent: Jan. 29, 2013

(54) ACTIVE MATERIAL FOR RECHARGEABLE BATTERY

(75) Inventor: Masaki Matsui, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/097,648

(22) Filed: Apr. 29, 2011

(65) Prior Publication Data
US 2012/0276444 A1    Nov. 1, 2012

(51) Int. Cl.
*H01M 6/04*    (2006.01)
(52) U.S. Cl. .......................... 429/188; 429/122
(58) Field of Classification Search ............ 429/188
See application file for complete search history.

(56) References Cited

U.S. PATENT DOCUMENTS

| | | | |
|---|---|---|---|
| 6,316,141 B1 | 11/2001 | Aurbach et al. | |
| 6,864,522 B2 | 3/2005 | Krieger et al. | |
| 7,488,526 B2 | 2/2009 | Hayashi et al. | |
| 2005/0058903 A1* | 3/2005 | Eylem et al. | 429/220 |
| 2006/0134492 A1* | 6/2006 | Hilchenko et al. | 429/33 |
| 2007/0172737 A1 | 7/2007 | Oki et al. | |
| 2008/0182176 A1 | 7/2008 | Aurbach et al. | |
| 2009/0264295 A1 | 10/2009 | Nardelli et al. | |

FOREIGN PATENT DOCUMENTS

| | | |
|---|---|---|
| JP | 11-345610 | 12/1999 |
| JP | 2000-012016 | 1/2000 |
| WO | 2009/008232 A1 | 1/2009 |

\* cited by examiner

*Primary Examiner* — Barbara Gilliam
*Assistant Examiner* — Gary Harris
(74) *Attorney, Agent, or Firm* — Gifford, Krass, Sprinkle, Anderson & Citkowski, P.C.

(57) ABSTRACT

A magnesium battery includes a first electrode including an active material and a second electrode. An electrolyte is disposed between the first electrode and the second electrode. The electrolyte includes a magnesium compound. The active material includes an inter-metallic compound of magnesium and bismuth.

16 Claims, 3 Drawing Sheets

ACTIVE MATERIAL FOR RECHARGEABLE BATTERY

FIELD OF THE INVENTION

The invention relates to electrochemical devices such as batteries, in particular rechargeable batteries, such as a rechargeable magnesium battery.

BACKGROUND OF THE INVENTION

Rechargeable batteries, such as lithium-ion batteries, have numerous commercial applications. Capacity density is an important characteristic, and higher capacity densities are desirable for a variety of applications.

A magnesium ion in a magnesium or magnesium ion battery carries two electrical charges, in contrast to the single charge of a lithium ion. Improved electrode materials would be very useful in order to develop high capacity density batteries.

SUMMARY OF THE INVENTION

In one aspect there is disclosed a magnesium battery that includes a negative electrode including an active material and a positive electrode. An electrolyte is disposed between the negative electrode and the positive electrode. The electrolyte includes a magnesium compound. The active material includes an inter-metallic compound of magnesium and bismuth.

In another aspect, there is disclosed an active material for a magnesium battery that includes bismuth metal wherein the active material has a phase corresponding to bismuth metal in a charged state of the active material and wherein the active material has a phase corresponding to an inter-metallic compound of magnesium and bismuth in a discharged state of the active material.

In a further aspect, there is disclosed a magnesium ion battery that includes a negative electrode including an active material and a positive electrode. An electrolyte is disposed between the negative electrode and the positive electrode. The electrolyte includes a magnesium compound. The active material includes an inter-metallic compound of magnesium and bismuth.

DETAILED DESCRIPTION OF THE INVENTION

Figure 1:
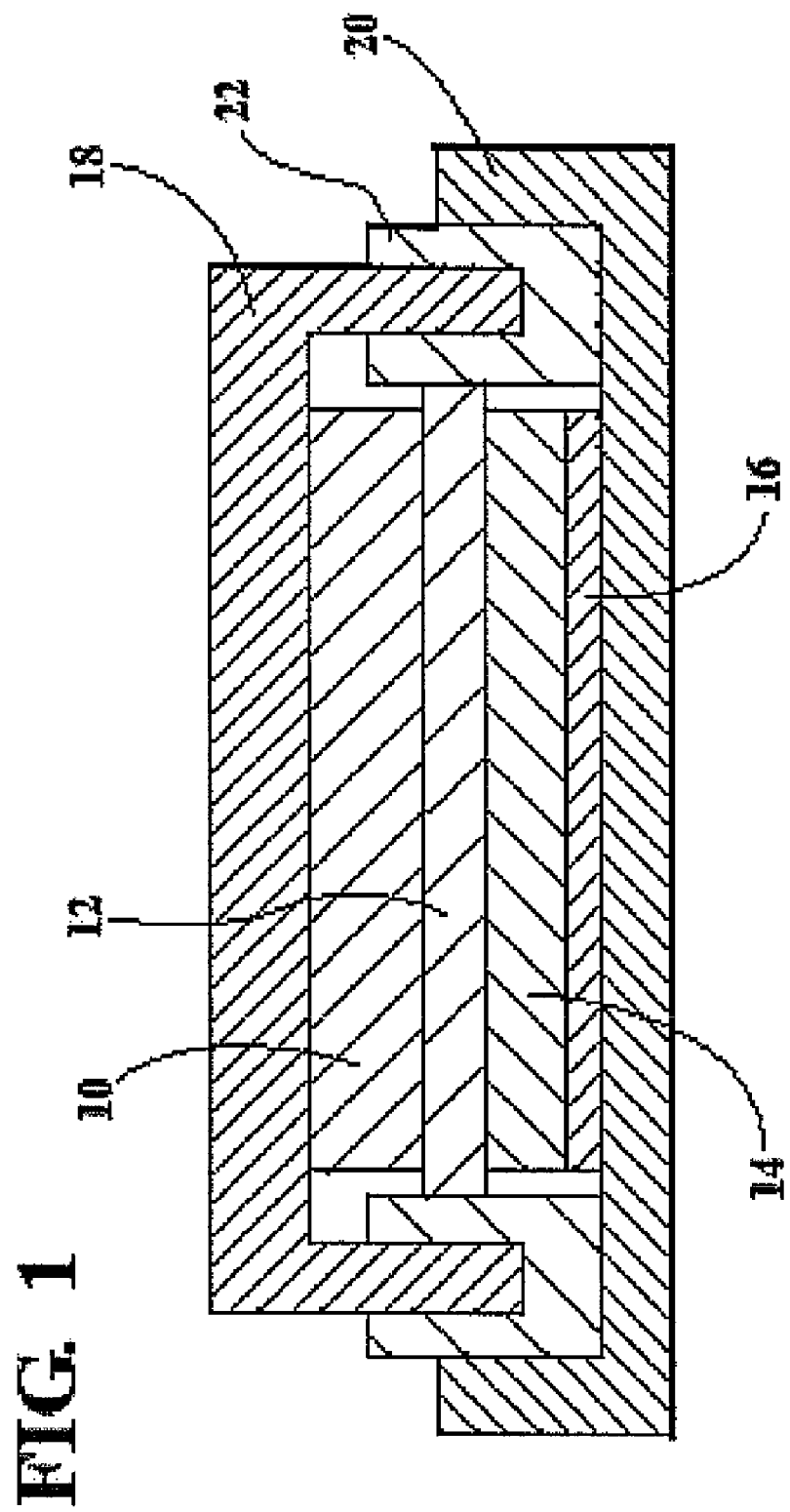
FIG. 1 is a diagram of a magnesium battery having a magnesium metal positive electrode and a negative electrode including a novel active material

Examples of the present invention include electrochemical devices, such as batteries, in particular rechargeable batteries. Examples include magnesium-based batteries, and specifically to materials used as active materials within the electrodes of a magnesium battery. In particular, an example battery includes an electrode active material that includes bismuth. For example, the active material may include bismuth and an inter-metallic compound of bismuth and magnesium. The improved active materials described herein may be used within the cathode and/or anode of an example battery.

In a specific example, which is not intended to be limiting, an improved active material for a magnesium battery includes bismuth and an inter-metallic compound of bismuth and magnesium having the formula $Mg_3Bi_2$.

A rechargeable magnesium battery is expected to be a high energy battery system, because of its high capacity density. In particular, as compared to lithium-ion batteries, the magnesium ion transfers two electrons per magnesium ion. However, previously there have been no good cathode or anode active materials which can fully utilize the advantage of the high capacity density.

In examples of the present invention, improved active materials including bismuth and an inter-metallic compound of bismuth and magnesium are used as the active material for a rechargeable battery. A particular example of an improved active material includes bismuth and $Mg_3Bi_2$. The active material may further include an electrically conductive material and a binder. Examples of electrically conducting materials include carbon particles, such as carbon black. Example binders include various polymers.

The electrolyte layer may include a separator which helps maintain electrical isolation between the positive and negative electrodes. A separator may include fibers, particles, web, porous sheet, or other form of material configured to reduce the risk of physical contact and/or short circuit between the electrodes. The separator may be a unitary element, or may include a plurality of discrete spacer elements such as particles or fibers. The electrolyte layer may include a separator infused with an electrolyte solution. In some examples, for example using a polymer electrolyte, the separator may be omitted.

The electrolyte layer may include a non-aqueous solvent, such as an organic solvent, and a salt of the active ion, for example a magnesium salt. Magnesium ions provided by the magnesium salt interact electrolytically with the active material(s). An electrolyte may be an electrolyte including or otherwise providing magnesium ions, such as a non-aqueous or aprotic electrolyte including a magnesium salt. The electrolyte may include an organic solvent. Magnesium ions may be present as a salt or complex of magnesium, or as any appropriate form.

An electrolyte may include other compounds, for example additives to enhance ionic conductivity, and may in some examples include acidic or basic compounds as additives. An electrolyte may be a liquid, gel, or solid. An electrolyte may be a polymer electrolyte, for example including a plasticized polymer, and may have a polymer infused with or otherwise including magnesium ions. In some examples, an electrolyte may include a molten salt.

In the example of a battery including an electrode having magnesium metal, magnesium may be present as a sheet, ribbon, particles, or other physical form. Magnesium may be present as substantially pure magnesium metal, or in some other form. For example, an electrode may include a magnesium-containing metal, such as a magnesium alloy. A magnesium-containing electrode may be supported by a current collector.

A current collector may include a metal or other electrically conducting sheet on which the electrode is supported. A metal sheet may include aluminum, copper, or other metal or alloy. In some examples, a metal housing may provide the function of a current collector. Other conducting materials, such as electrically conducting polymers, may be used as the current collector.

A binder used in an electrode may include any material capable of binding the electrode components. Many binders are known in the battery arts, for example various polymer binders are known and can be used.

FIG. 1 shows a rechargeable magnesium-ion battery having an improved negative electrode active material. The battery includes a positive electrode 10 including magnesium metal, an electrolyte layer 12, a negative electrode 14, current collector 16, negative electrode housing 18, positive electrode housing 20, and sealing gasket 22. The electrolyte layer 12 includes a separator soaked in electrolyte solution, and the positive electrode 14 is supported by the current collector 16. In this example, the negative electrode includes an improved active material according to an example of the present invention, conductive carbon, and a binder. For example, the negative electrode may include bismuth and an inter metallic compound of bismuth and magnesium such as $Mg_3Bi_2$.

EXAMPLES

Bismuth powder was purchased from Sigma Aldrich (CAS 7440-69-9) and mixed with acetylene black (DENKAHS-100) and PVdF (Kreha KF-Polymer) as binder to prepare a paste respectively. Prepared pastes were coated on Ni or Cu current collector by conventional electrode preparation process. A Bi/Mg cell was fabricated with a commercial electrochemical cell (Tomcell TJAC). Grignard based electrolyte (0.25M EtMgCI-Me, AICI in THF) was prepared as electrolyte solution and Mg metal disc (ESPI metals 3N purity) was prepared as a counter electrode. The Mg metal cathode was scraped by slide glass to remove MgO layer at the surface before cell fabrication. A galvanostatic charge-discharge test for the Bi/Mg cell was operated at 0.43 C (1 mA I cell). The XRD analysis of the charged and discharged anode was carried out with Cu-Ka beam (40 kV 44 mA) at a scan rate 2° min-1 in the 2theta range 10-60°.

Figure 2:
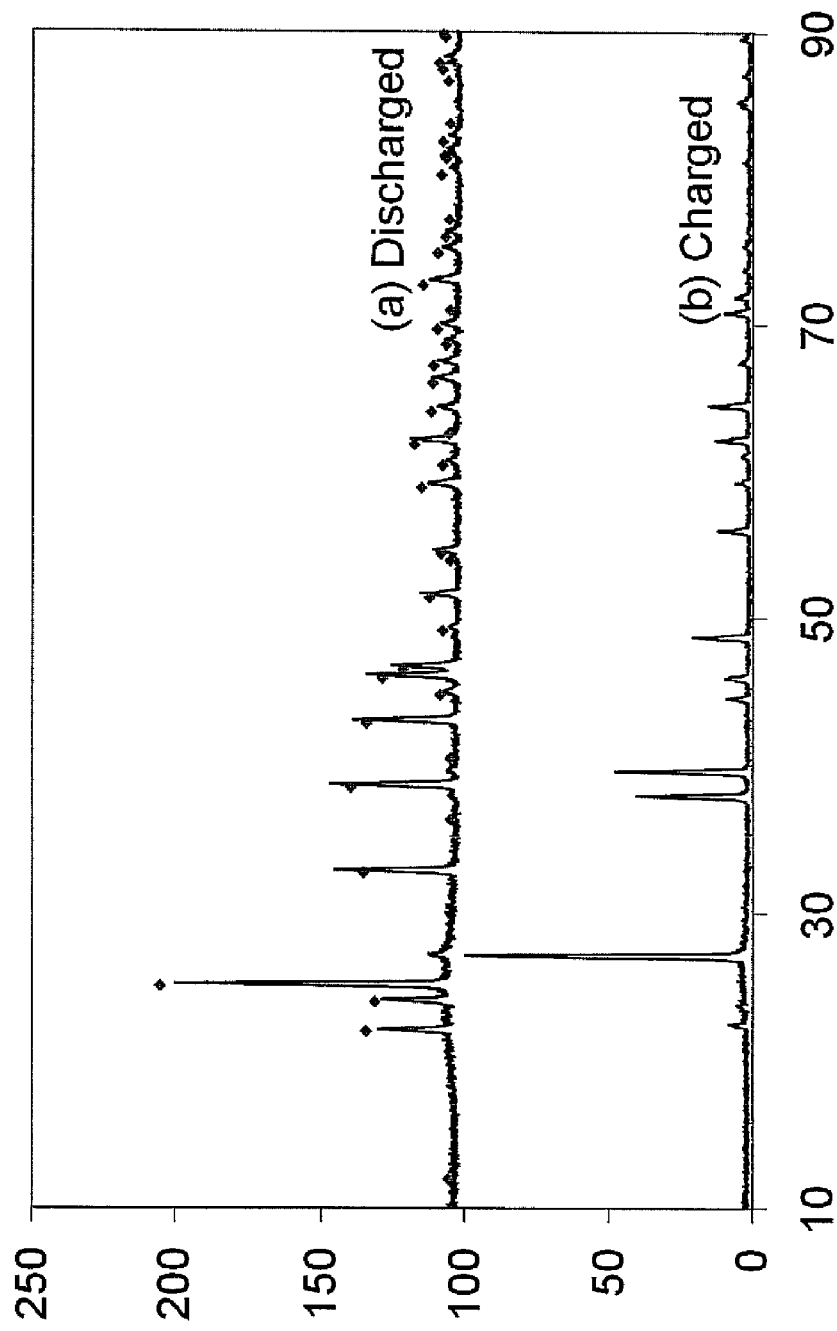
FIG. 2 is an XRD plot of the intensity as a function of theta for a bismuth anode active material indicating a bismuth and inter-metallic species.

FIG. 2 shows an XRD plot of a bismuth anode active material for both a discharged and charged anode. As can been seen in the plot, the discharged curve closely matches the pattern of $Mg_3Bi_2$ indicated by the diamonds on the plot. The diamond pattern is for a hexagonal inter-metallic $Mg_3Bi_2$ phase. The curve corresponding to the charged anode closely follows the pattern for a rhombohedral phase of bismuth indicated by the dots. The combination of the discharged and charged curves indicates a two phase reaction between bismuth and the inter-metallic $Mg_3Bi_2$ occurs during the charge and discharge cycle of the magnesium battery.

Figure 3:
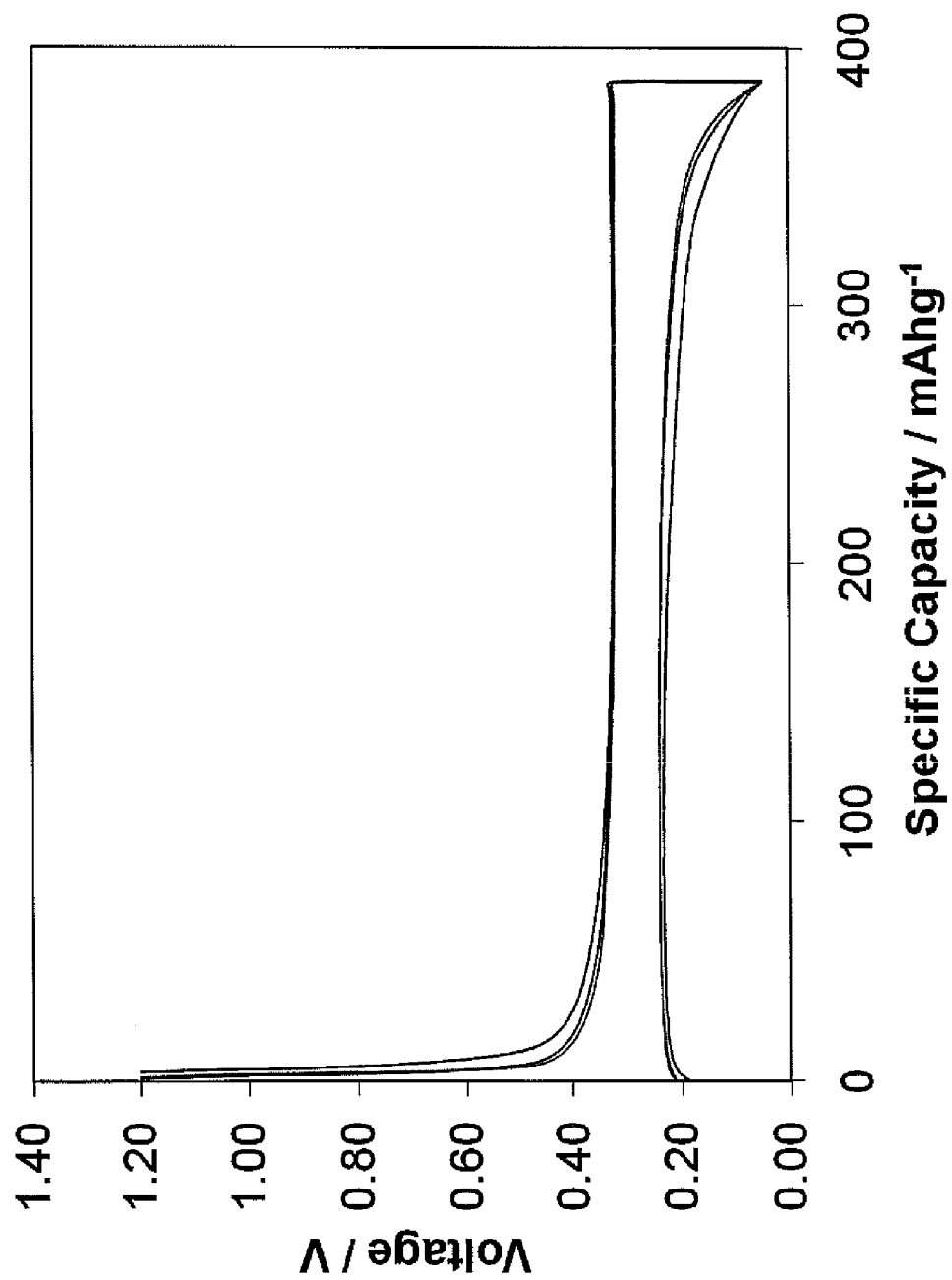
FIG. 3 is a plot of the voltage as a function of the specific capacity for an anode active material including bismuth in a cycling test.

FIG. 3 shows a charge/discharge curves for an anode active material of bismuth and an inter-metallic compound of bismuth and magnesium. A bismuth-magnesium cell having an electrolyte of 0.25M EtMgCl-2Me2AlCl was run at a current of 1milliamp (0.43 C). As can be seen from the plot, the electrode configurations showed an energy capacity of more than 380 milliamp-hours/gram with 100 percent Coulombic efficiency. The plot indicates an energy capacity of approximately 387 milliamp-hours/gram.

The plot for a magnesium/bismuth half cell showed the Coulombic efficiency of approximately 100%, and a continuously stable discharge capacity of 387 mAh/g. Hence, the magnesium/bismuth system has significant potential advantages in terms of capacity density over lithium-ion batteries.

Examples of the present invention include batteries having one or more cells, electrically connected in parallel and/or series, in any appropriate form factor such as button cells, other round cells, cylindrical cells, rectangular or other prismatic cells, and the like. Example apparatus also include rolled-up battery forms, and combinations of a battery with a supercapacitor and/or fuel cell, and the like.

Examples of the present invention also include various electrically-powered apparatus, such as consumer electronic devices, medical devices, electric or hybrid vehicles, or other apparatus including batteries according to examples of the present invention.

Examples of the present invention include both primary (non-rechargeable, e.g. magnesium batteries) and secondary (rechargeable, e.g. magnesium ion) batteries. Specific examples include rechargeable magnesium-ion batteries. The term magnesium-based battery includes both primary and secondary batteries, i.e. both magnesium batteries and magnesium-ion batteries. Examples of the present invention include any magnesium-based battery, including rechargeable magnesium-ion batteries having a capacity density greater than conventional lithium-ion rechargeable batteries.

Electrodes may be fabricated by any suitable method. For example, a paste may be formed of particles of the active material, a binder, and an electron-conducting material (e.g. graphitic carbon particles or carbon black). The paste may be deposited on an electrically conducting substrate, such as a current collector, and heat treated as necessary.

An improved process of fabricating a battery, such as a rechargeable magnesium-ion battery, includes providing negative and positive electrodes separated by an electrolyte, at least one electrode including bismuth and an inter-metallic of bismuth and magnesium such as $Mg_3Bi_2$.

The invention is not restricted to the illustrative examples described above. Examples described are not intended to limit the scope of the invention. Changes therein, other combinations of elements, and other uses will occur to those skilled in the art. The scope of the invention is defined by the scope of the claims.

Having described our invention, I claim:

1. A magnesium battery comprising:
   a negative electrode, including an active material;
   a positive electrode;
   an electrolyte disposed between the negative electrode and the positive electrode, the electrolyte including a magnesium compound providing magnesium ions that interact electrolytically with the active material,
   the active material including an inter-metallic compound of magnesium and bismuth.

2. The magnesium battery of claim 1 wherein the negative electrode includes bismuth.

3. The magnesium battery of claim 1, wherein the positive electrode includes magnesium metal or a magnesium alloy.

4. The magnesium battery of claim 1 wherein the active material includes $Mg_3Bi_2$.

5. The magnesium battery of claim 1 wherein the active material has a phase corresponding to bismuth metal in a charged state of the active material and wherein the active material has a phase corresponding to an inter-metallic compound of magnesium and bismuth in a discharged state of the active material.

6. The magnesium battery of claim 1 wherein the negative electrode includes a binder, an electrically conducting material, and the active material.

7. An active material for a magnesium battery comprising:
   a negative electrode active material including bismuth metal wherein the active material has a phase corresponding to bismuth metal in a charged state of the active material and wherein the active material has a phase corresponding to an inter-metallic compound of magnesium and bismuth in a discharged state of the active material.

8. The active material of claim 7 wherein charged state has a phase corresponding to a rhombohedral phase of bismuth.

9. The active material of claim 7 wherein the discharged state has a phase corresponding to a hexagonal phase of $Mg_3Bi_2$.

10. The active material of claim 7 wherein the active material is included on a negative electrode assembly having a binder, an electrically conducting material, and the active material.

11. A magnesium-ion battery comprising:
a negative electrode, including an active material;
a positive electrode;
an electrolyte disposed between the negative electrode and the positive electrode, the electrolyte including a magnesium compound providing magnesium ions that interact electrolytically with the active material,
the active material including art inter-metallic compound of magnesium and bismuth.

12. The magnesium ion battery of claim 11 wherein the first negative electrode includes bismuth.

13. The magnesium ion battery of claim 11, wherein the positive electrode comprises magnesium metal or a magnesium alloy.

14. The magnesium ion battery of claim 11 wherein the active material includes $Mg_3Bi_2$.

15. The magnesium ion battery of claim 12 wherein the active material has a phase corresponding to bismuth metal in a charged state of the active material and wherein the active material has a phase corresponding to an inter-metallic compound of magnesium and bismuth in a discharged state of the active material.

16. The magnesium ion battery of claim 11 wherein the negative electrode includes a binder, an electrically conducting material, and the active material.

* * * * *

UNITED STATES PATENT AND TRADEMARK OFFICE
CERTIFICATE OF CORRECTION

| | |
|---|---|
| PATENT NO. | : 8,361,651 B2 |
| APPLICATION NO. | : 13/097648 |
| DATED | : January 29, 2013 |
| INVENTOR(S) | : Masaki Matsui |

It is certified that error appears in the above-identified patent and that said Letters Patent is hereby corrected as shown below:

In the Claims:

At column 6, line number 1, After "the", delete "first"

Signed and Sealed this
Twentieth Day of January, 2015

Michelle K. Lee
*Deputy Director of the United States Patent and Trademark Office*